Patented Dec. 22, 1942

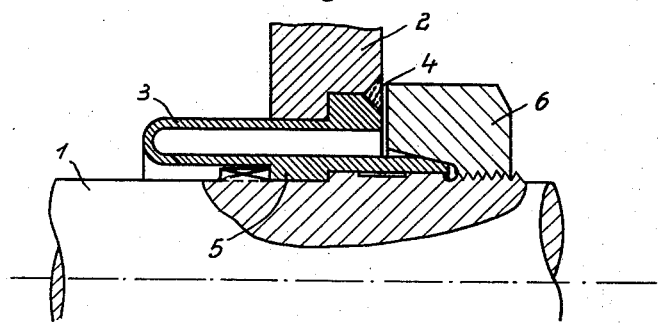
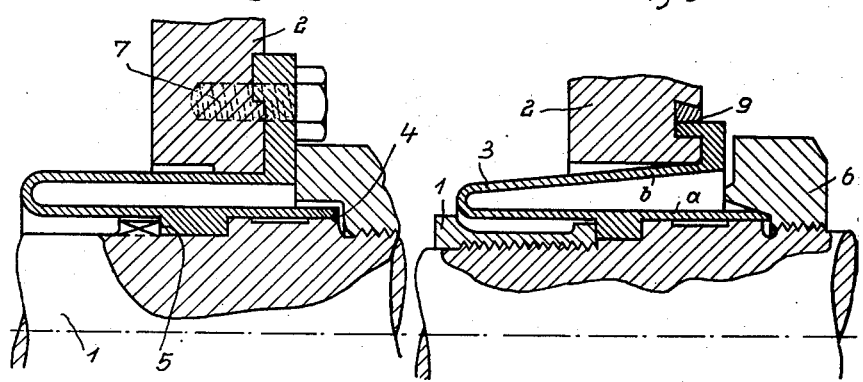
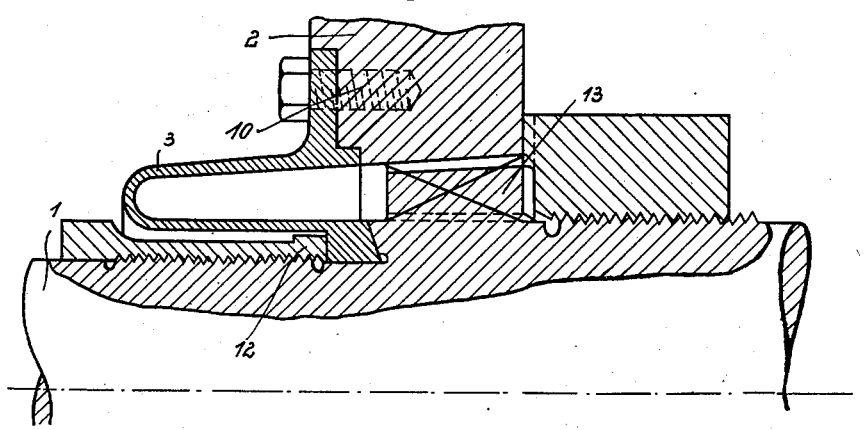

2,305,768

UNITED STATES PATENT OFFICE 2,305,768

TURBINE CONSTRUCTION

Ernst Gente, Berlin-Siemensstadt, Germany; vested in the Alien Property Custodian Application July 24, 1939, Serial No. 286,108
In Germany July 25, 1938

4 Claims. (Cl. 253—39)

This invention relates to an improvement in the mounting of steam turbine discs on their shafts, and is particularly concerned with the provision of an improved elastic connecting member arranged between such a disc and the shaft.

In steam turbines, particularly in turbines with radial admission of the operating medium operating at high temperatures, it has proved advantageous to dispense with the rigid connection between the turbine disc and the shaft and to connect these two parts by means of an elastic connecting member. Similar considerations apply to composite turbine discs. It has been customary in the past to make the elastic connecting member from the material of one of the two structural parts to be connected. Since the elasticity required for the above purpose is only ensured if the connecting members are made relatively thin, these members are subject to damage during the assembling or the dismantling of the turbine. These members also deteriorate, due to the corrosive effect of the steam. A greater reliability of operation may be ensured by making the elastic connecting member not integral with the parts to be secured but as a separate part forming a joint or bond between these parts. The invention relates particularly to the manner of making this joint between the turbine discs and the shafts thereof. According to the invention, at least one of the two joints is a screw joint. It is thus possible to choose for the connecting member a material other than that employed for the disc or shaft; i. e., for instance, a material having a different coefficient of expansion or a material having a particularly great elasticity or a material which is resistant to chemical attacks and mechanical stresses. In accordance with the invention, the elastic connecting members which are subjected to chemical attacks and are liable to be damaged are made in such a manner that they may easily be interchanged and permit forming a steam-proof seal. The centering of the disc with respect to the shaft or the disc parts may be effected in accordance with the invention in an absolutely safe manner without producing any undesired stresses when securing the disc to the shaft. Additional advantages may be obtained by designing and disposing the elastic connecting member so as to relieve it of torsional stresses.

In order that the invention may be more readily understood, some embodiments thereof will now be described with reference to the accompanying drawing. In this drawing Fig. 1 is a radial sectional view of an elastic connecting member made and disposed with respect to the turbine disc and the shaft in accordance with the invention;

Fig. 2 illustrates another embodiment of the invention in a similar section;

Fig. 3 shows a modification of the embodiment illustrated in Fig. 2; and

Fig. 4 represents still another embodiment in a radial sectional view which is particularly provided for a structure that has to transmit a considerable torque.

Like parts are designated by like reference numerals throughout the drawing.

In Fig. 1, 1 denotes the shaft, 2 the turbine disc and 3 the resilient intermediate member connecting the shaft with the disc. According to the invention the intermediate member is neither made from the material of the disc 2 nor from that of the shaft 1, but forms a separate part and is secured to the disc 2 as indicated at 4 by welding. The shaft is secured to the resilient intermediate member by means of a bayonet lock 5, the pressure being brought about by a nut 6. As shown in the drawing, the connecting member 3 is U-shaped in cross-section with an enlargement entering a cut-away section in the disc 2, the enlargement being welded to the disc at 4. The bayonet lock is formed by the portion 5 projecting from the inner leg of the U, thus forming a locking area for engagement with the shoulder on the shaft, as shown in the drawing. The lower or inner leg of the U-shaped connecting member extends axially of the shaft and is provided at its end with a tapered portion for engagement with the locking nut 6. The latter engages the other leg of the connecting member and the disc at the place where these two parts are welded together so as to provide a steam-tight fit.

In the embodiment shown in Fig. 2 a sort of a kinematic reversal is effected, insofar as the screw 7 lies between the disc and the elastic packing member 3, whereas the welded joint 4 serves to secure the elastic member 3 to the shaft 1. In other respects this embodiment corresponds substantially to that shown in Fig. 1. It will be seen that there is again a locking projection such as 5 engaging a shoulder on the shaft to position the connecting member securely, and a nut on the shaft engaging the radial extension which is fastened on the disc by means of the bolt 7, thus providing the steam-tight fit.

In the embodiment shown in Fig. 3 a caulked joint 9 is employed instead of a welded joint or screw. In other respects the embodiment is quite similar to the one shown in Fig. 1. The nut 6 again provides a steam-tight protective joint and holds the connecting member on the shaft at one end of the lower U-leg, while another nut engages the locking projection 5 and presses its other side into engagement with the shoulder on the shaft.

In Fig. 4 is shown a form of the invention in which the elastic connecting member 3 would have to transmit a great torque from the disc 2 to the shaft 1. The connection between the shaft 1 and the disc 2 is effected by the screw 10 and the threaded sleeve 12; however, the torque is taken up by the lugs 13 arranged between the disc and the shaft. These lugs are held in place by the locking nut on the shaft corresponding to similar locking nuts shown in the other embodiments.

What is claimed is:

1. In a turbine construction, a rotor shaft, a shoulder on said shaft, a disc having a centrally apertured hub for accommodating said shaft, a lateral cut-out in said hub, and an elastic connecting member disposed between said hub and said shaft, said member comprising a ring-like body which is generally U-shaped in cross section, a locking projection on the inner leg of said body, connector means for securing the inner leg of said body on said shaft with the projection thereof in locking engagement with said shoulder, and connector means for securing the outer leg of said body on said hub in locking engagement with the lateral cut-out thereon.

2. The structure defined in claim 1, together with means for sealing said connecting member against the corrosive effect of steam.

3. The structure defined in claim 1, wherein the legs of said connecting member extend axially between the hub and the shaft for only part of the width of the hub, together with lug means disposed between the hub and the shaft for the remaining width of the hub for transmitting the torque setup between the shaft and the disc incident to rotation thereof.

4. In a turbine construction, the combination of a rotor shaft with a radially extending disc mounted thereon for rotation therewith, comprising a resilient ring-like member which is generally U-shaped in cross section and is interposed between said shaft and said disc with the legs thereof substantially in parallel with the axis of said shaft, a shoulder on said rotor shaft, a projection on the outside of the inner leg of said member, screw connector means on said shaft for securing the inner leg of said member thereon with said projection in locking engagement with said shoulder, a groove disposed laterally in the body of said disc, a projection extending laterally from the outer leg of said member for engagement with said groove, and means for securing said last named projection in locking engagement with said groove.

ERNST GENTE.